Figure 1:
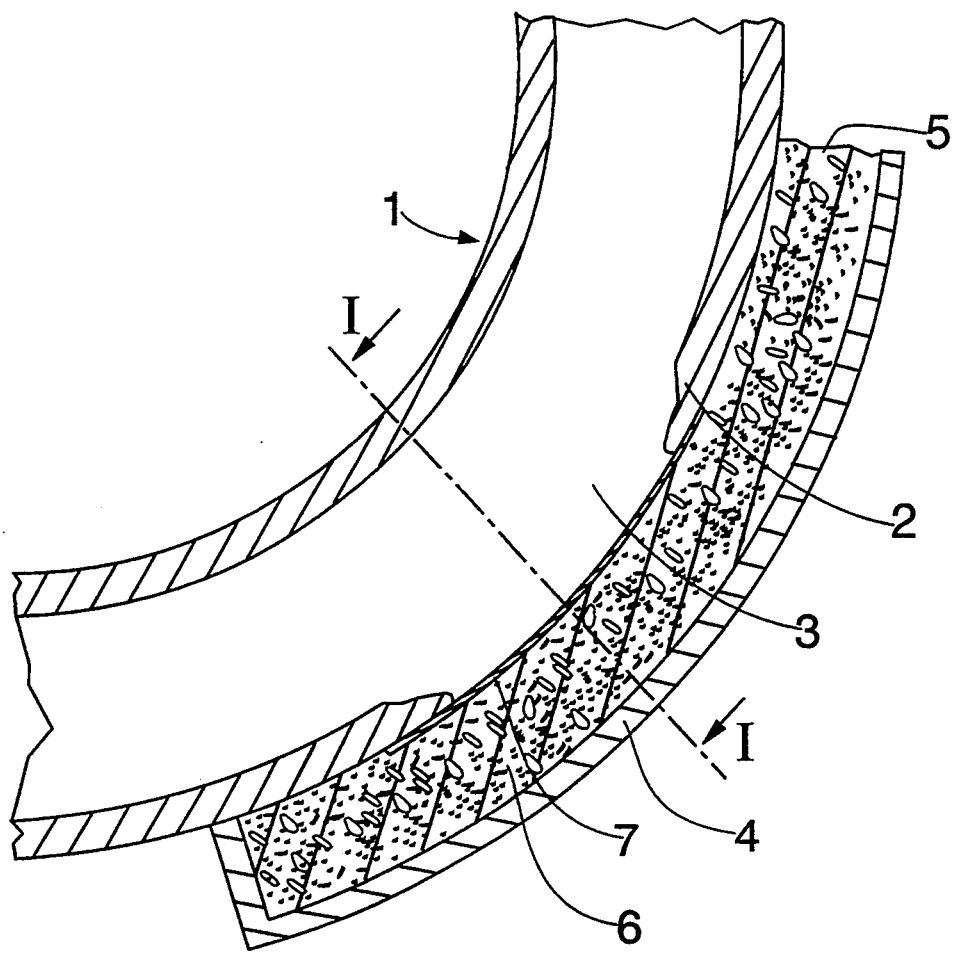

United States Patent [19]
Johansen et al.

[11] Patent Number: 5,388,317
[45] Date of Patent: Feb. 14, 1995

[54] METHOD FOR REINFORCING AND REPAIRING EQUIPMENT PARTS AND COMPONENTS SUBJECTED TO HEAVY ABRASIVE WEAR

[75] Inventors: Knut H. Johansen; Oyvind Larsen; Hans H. Schelderup, all of Kristiansand, Norway

[73] Assignee: Elkem a/s, Norway

[21] Appl. No.: 33,424

[22] Filed: Mar. 18, 1993

Related U.S. Application Data

[63] Continuation of Ser. No. 772,561, Oct. 7, 1991, abandoned.

[30] Foreign Application Priority Data

Oct. 8, 1990 [NO] Norway ................. 904348

[51] Int. Cl.⁶ .................. B23P 6/04; F16L 55/16
[52] U.S. Cl. .................. 29/402.18; 138/99; 264/36
[58] Field of Search .......... 29/402.09, 402.16, 402.18, 29/402.13; 138/99; 264/31, 32, 36

[56] References Cited

U.S. PATENT DOCUMENTS

| | | | |
|---|---|---|---|
| 1,154,376 | 9/1915 | Claiborne | 138/99 |
| 1,285,210 | 11/1918 | Jones | 138/99 X |
| 4,068,483 | 1/1978 | Papworth | 264/36 X |
| 4,176,691 | 12/1979 | Jude et al. | |

FOREIGN PATENT DOCUMENTS

| | | |
|---|---|---|
| 122382 | 10/1984 | European Pat. Off. |
| 2246804 | 5/1975 | France |
| 3017632 | 11/1981 | Germany |
| 232461 | 1/1986 | Germany |
| 451275 | 9/1987 | Sweden |
| 1398991 | 6/1975 | United Kingdom |
| 1532651 | 11/1978 | United Kingdom |
| 2080475 | 2/1982 | United Kingdom |
| 2150253 | 6/1985 | United Kingdom |
| 2165328 | 4/1986 | United Kingdom |

OTHER PUBLICATIONS

Belzona Molecular, Confidential Report No. 8012, "Molecular Metal for Repairing Leaking and Fractured Pipes", 1984.

Belzona Molecular, Tecnologia Molecular e ingenieria del know-how en la Industrai Naval. Capitulo 6, "Reparaciones en Tuberias y Conductos".

*Primary Examiner*—Joseph M. Gorski
*Attorney, Agent, or Firm*—Lucas & Just

[57] ABSTRACT

The method is accomplished by having a casing affixed about the area of the equipment component or part subject to the abrasive wear. A wear-resistant concrete material is cast into the spacing between the casing and the surface of the equipment. A wear-resistant ceramic plate or steel plate can also be affixed to the surface of the equipment prior to casting the concrete in place.

8 Claims, 2 Drawing Sheets

METHOD FOR REINFORCING AND REPAIRING EQUIPMENT PARTS AND COMPONENTS SUBJECTED TO HEAVY ABRASIVE WEAR

This is a continuation of application Ser. No. 07/772,561, filed Oct. 7, 1991, now abandoned.

The relates to a method for reinforcing and repairing equipment parts and components subjected to heavy abrasive wear during use.

Abrasive wear is a frequent and costly problem in a variety of industries such as the mining industry, the mineral processing and transportation industry, coal fired power plants and oil and gas production installations.

In all these industries a common problem is the abrasive wear caused by solid particles on equipment used for handling and transportation of such solid particles. The particles may be transported or handled in dry form, for example by pneumatic transport, or in a liquid slurry form. Normally some parts of such transportation and handling equipment are more subjected to abrasive wear than the rest of the equipment. One typical example is bends in transportation lines for particles. Whereas the greater part of the transportation line can have a lifetime of up to many years, bends in the transportation lines may have a lifetime of just a few weeks. Such transportation lines and other handling equipment must therefore very often be stopped for maintenance, which normally includes replacement of bends and other critical components. Thus the maintenance costs are very high and production is lost due to the high downtime of the equipment. This problem has frequently been tried to be solved by replacing critical parts made from standard material with parts made from more wear resistant materials. This does, of course, somewhat increase the lifetime of the critical parts, but unfortunately the costs for wear resistant materials are very high so the overall costs are not significantly reduced.

There is therefore a need for a simple and low cost method for reinforcing or repairing critical parts which are subjected to high abrasive wear.

It is an object of the present invention to provide a simple low-cost method for reinforcing and repairing equipment parts and components which are subjected to abrasive wear during use.

Accordingly, the present invention relates to a method for reinforcing or repairing equipment parts and components subjected to abrasive wear, comprising affixing to the outside surface of the equipment part or component an abrasive resistant material comprising at least a concrete material enclosed in a casing affixed to the equipment parts or the component.

According to a preferred embodiment of the method according to the present invention a ceramic wear resistant material having one surface corresponding to the surface to be repaired or reinforced is temporarily affixed to the equipment parts or the component, whereafter a concrete material is filled into a cavity between the ceramic material and an enclosing casing.

The method of the present invention is particularly suitable for reinforcing or repairing parts of transportation lines such as bends and other parts which are subjected to abrasive wear by particles transported in the transportation lines.

If the places subjected to heavy abrasive wear can be localized during the design of a transportation line or any other equipment, these places can already during construction of the equipment be reinforced by the method of the present invention. The lifetime of the critical parts can thereby from the very beginning be strongly increased.

In other cases spots or areas on equipment parts or components subjected to high abrasive wear can be detected after having been in use for some time and can then be repaired by the method according to the present invention. In many cases equipment parts and components which normally would have been considered to be completely worn out can be repaired by the method of the present invention.

Figure 2:
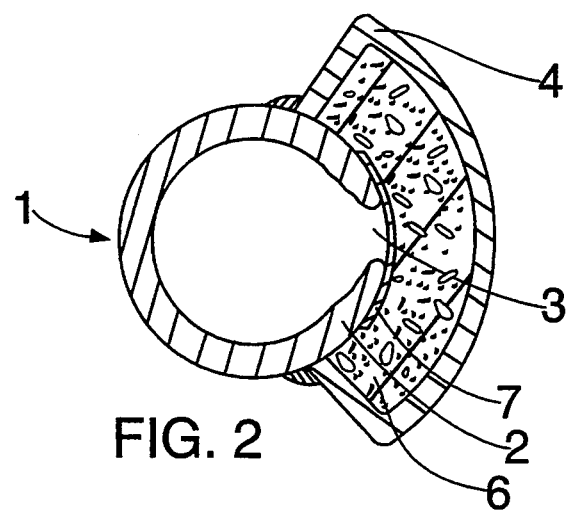
Figure 3:
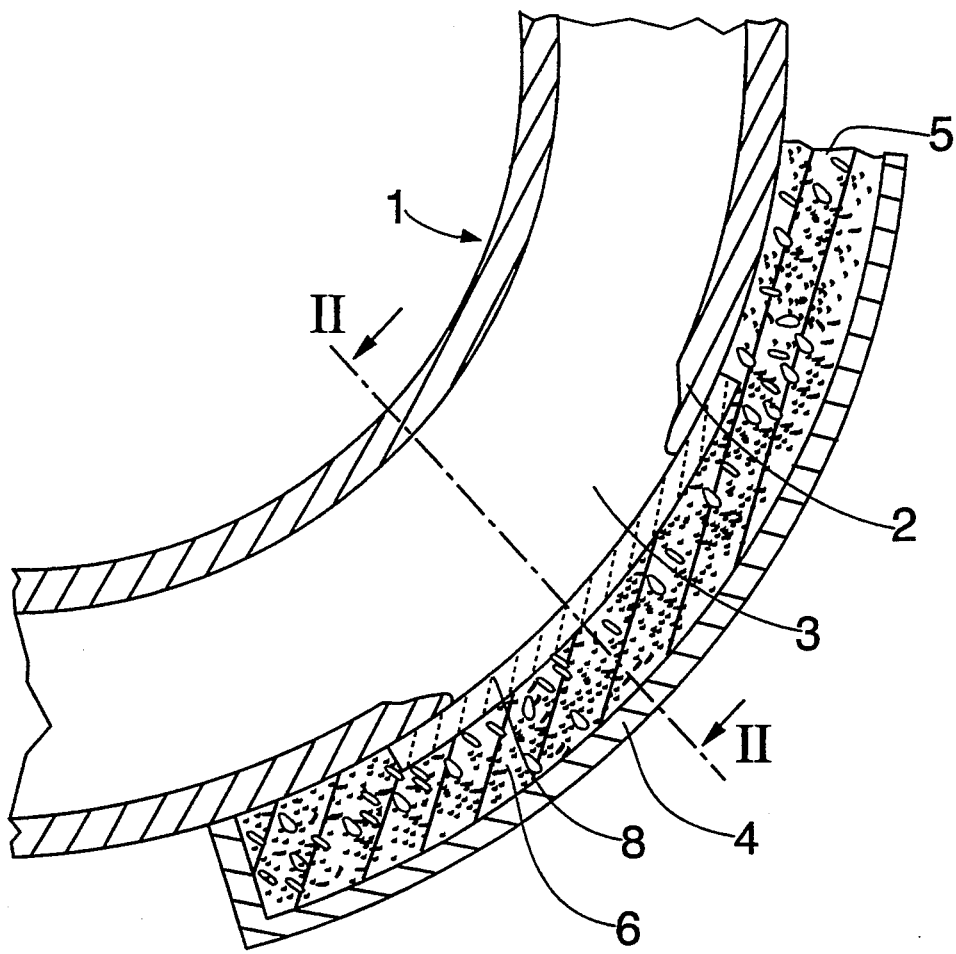
Figure 4:
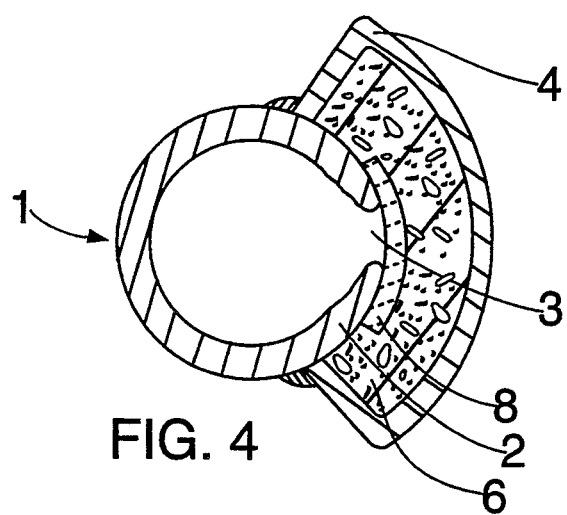

The method according to the present invention will now be further described by way of examples and with reference to the accompanying drawings, wherein, FIG. 1 shows an axial cut through a pipe bend repaired or reinforced according to the method of the present invention, FIG. 2 shows a cut taken along line I—I of FIG. 1, FIG. 3 shows an axial cut through a pipe bend repaired or reinforced according to another embodiment of the present invention, and wherein, FIG. 4 shows a cut taken along line II—II of FIG. 3.

In the embodiment shown in FIGS. 1 and 2 there is shown a pipe bend 1 made from steel. The pipe bend can for example be a part of a transportation line for transporting particles causing abrasive wear. After having been used for some time a part of the wall 2 in the pipe bend 1 will be worn and perforated as shown by reference numeral 3.

This worn out bend is now repaired by the method according to the present invention.

The outside surface of the area of the wall 2 to be repaired is, if necessary, sandblasted and cleaned. A casing 4 made from steel plates is welded to the outside of the area of the pipe bend 1 to be repaired. The casing 4 is provided with an opening 5 at its upper end. A wear resistant concrete mixture 6 is made and cast through the opening 5 in the casing 4 and into the cavity between the wall 2 of the pipe bend 1 and the casing 4. If necessary vibration is used to secure a voidfree concrete material. After a few hours hardening time in order for the concrete 6 to reach some strength, the pipe bend 1 can again be put into operation.

In most cases this method of repairing can be done without demounting the parts to be repaired. The only space needed is the space necessary to bring the casing 4 in place.

It should be appreciated that if the pipe bend 1 has big holes it can be necessary to cover the holes with a thin steel plate 7 or the like in order to prevent the concrete from flowing through such holes and into the interior of the pipe bend 1.

The embodiment shown in FIGS. 3 and 4 only differs from the embodiment of FIGS. 1 and 2 in that a plate 8 of ceramic abrasive resistant material is placed in contact with the worn out area of the pipe bend 1 before the concrete 6 is cast into the casing 4. In order to keep the ceramic plate 8 in place before the casing 4 is put in place and the concrete 6 is supplied, the ceramic plate 8 is affixed to the wall 2 of the pipe bend 1 by means of for example glue or some other affixing means.

By the method according to this embodiment a surprisingly high abrasive wear protection at a very low cost, as the ceramic material is only used in the specific areas subjected to high abrasive wear.

EXAMPLE 1

In a transport line for dry nepheline syenite particles the bends had to be replaced about every 6 months due to perforations caused by the abrasive wear caused by the nepheline syenite particles. The transport line was made from steel pipes of 60 mm diameter and comprised two bends of radius 500 and 580 mm.

The two bends were repaired using the method of the present invention in the way described above in connection with FIGS. 1 and 2. A super concrete with SiC filler was cast into a casing made from 3 mm steel plates. Two years after the repair there have been no signs of perforations or any abnormalities in the bends repaired according to the method of the present invention. Thus the lifetime of the bends has been increased at least four times.

EXAMPLE 2

The method according to the present invention was used for repairing a bend on a vacuum cleaning line used for collecting dust from a latheing operation in production of large carbon electrodes. A total of 5 bends made from steel pipes having a diameter of 60 mm and a wall thickness of 3 mm were repaired according to the method of the present invention. The bend radii were up to 1200 min. The installed repair lengths were up to 800 mm. Normal operation life of the steel bends was typically 2 weeks. The corresponding operation life of the bends after having been repaired according to the method of the present invention using a concrete containing SiC as a filler cast into a casing made from steel plates of 3 mm thickness drastically increased. Thus the bends repaired in this way have now been in operation for 5 months giving an increase in lifetime of at least 10 times.

EXAMPLE 3

Some of the bends in the vacuum cleaning line described in example 2 were repaired in the same way as in example 2 except that a siliconized silicon carbide wear plate of 8 mm thickness was arranged in contact with the wall of the bend before the casing was mounted and the concrete was cast into the casing. These bends have now been in operation for six months and so far very little wear has been observed. It is therefore expected that the bends will have a lifetime between 1 and 2 years.

What is claimed:

1. A method for repairing a hole in a pipe wherein said hole is at a bend in said pipe, said pipe having a longitudinal axis and being used for transporting particulate material, said method comprising the steps of:
   (a) affixing a casing to the exterior of said pipe at said bend in said pipe over an area of said pipe which has said hole, said casing not extending annularly around the circumference of said pipe, the bottom and the sides of said casing being affixed to said pipe such that said casing forms a pocket with said pipe and such that the hole in said pipe is in said pocket, said pocket having an opening which is defined by the top of said casing and the exterior of said pipe, said pocket being oriented such that the sides of said pocket are parallel with the longitudinal axis of said pipe, and the bottom and opening of said pocket exists in planes transverse to the longitudinal axis of said pipe,
   (b) pouring into said pocket a fluid wear-resistant concrete mix, thereby filling said pocket to a level such that said hole is covered, and
   (c) hardening said concrete in said pocket.

2. The method of claim 1 further comprising the step of affixing a plate over said hole in said pipe before the step of affixing said casing to the exterior of said pipe.

3. The method of claim 2 wherein said plate is made of steel.

4. The method of claim 2 wherein said plate is made of a ceramic wear-resistant material.

5. The method of claim 4 wherein said ceramic wear-resistant material is siliconized silicon carbide.

6. The method of claim 4 wherein said step of affixing said ceramic wear-resistant material is accomplished by gluing said plate to said pipe.

7. The method of claim 1 wherein the step of affixing said casing to the exterior of said pipe is accomplished by welding said casing to the exterior of said pipe.

8. The method of claim 1 wherein said casing is made from steel.

* * * * *